Sept. 18, 1956  C. W. TATUM  2,763,332
STAY BAR FOR REAR DRIVEN AUTOMOBILE WHEELS
Filed Oct. 26, 1953
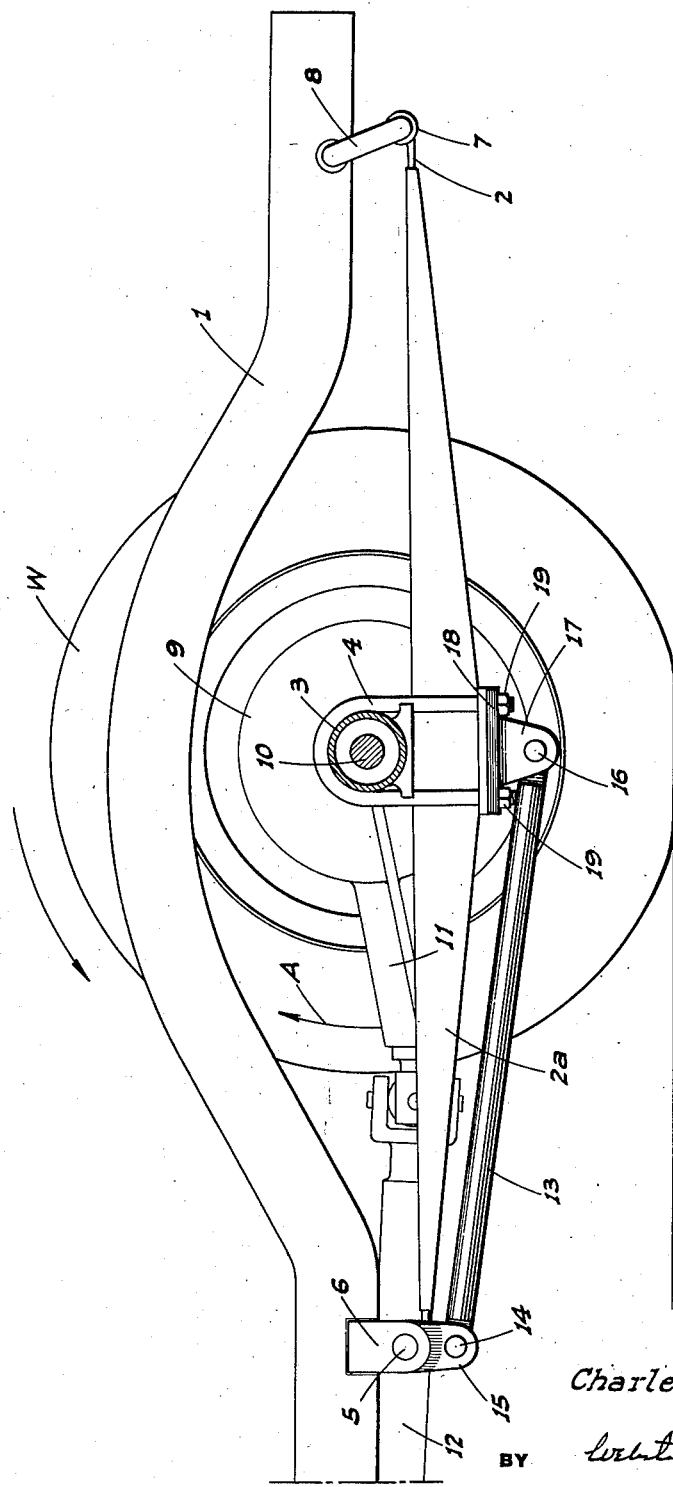
INVENTOR
Charles W. Tatum
BY
ATTORNEYS

United States Patent Office 2,763,332
Patented Sept. 18, 1956

2,763,332

STAY BAR FOR REAR DRIVEN AUTOMOBILE WHEELS

Charles W. Tatum, Stockton, Calif.

Application October 26, 1953, Serial No. 388,373

1 Claim. (Cl. 180—85)

This invention relates to motor vehicles which employ the "Hotchkiss" type of suspension and mounting for the rear drive wheels; such mounting including leaf springs strapped intermediate their ends to the rear axle housing, and connected at their forward end to clevises rigid with the frame of the vehicle, so that the forward portions of the springs serve as tension members as well as spring elements.

The rear axle is of course driven from the longitudinal drive shaft through a differential mechanism which includes a drive gear, and a pinion mounted on the drive shaft engaging the gear; the adjacent portion of the drive shaft being journaled in the housing of the mechanism and which housing is rigid with the axle housing to which the springs are strapped. The result is that when a sudden accelerating rotation is imparted to the drive shaft, to rotate the drive wheels forwardly, a rotative tendency in the opposite direction is imparted to the differential and axle housings. This tends to bow the forward portion of the springs upwardly, and the wheels tend to lift off the ground. The net result is a temporary loss of traction, and a chattering or shuddering of the rear drive structure or unit, which is transmitted throughout the entire chassis.

The principal object of the present invention therefore is to eliminate the above described objectionable results by the provision of stay bars so mounted in connection with the springs and rear axle housing as to counteract the above tendencies, without any loss of normal spring action and efficiency.

Another object of the invention is to provide for the mounting of the stay bars in such a manner that they may be easily installed on vehicles already in operation, as well as capable of being incorporated in a vehicle during manufacture thereof, with only slight changes in any parts already used in such manufacture being required.

Still another object of the invention is to provide a stay bar for rear driven automobile wheels which is designed for ease and economy of manufacture.

It is also an object of the invention to provide a practical, reliable, and durable stay bar for rear driven automobile wheels, and one which will be exceedingly effective for the purpose for which it is designed.

These objects are accomplished by means of such structure and relative arrangements of parts as will fully appear by a perusal of the following specification and claim.

The figure on the drawing is a somewhat diagrammatic side elevation of a Hotchkiss type rear end portion of a motor vehicle chassis showing my improved stay bar mounted thereon.

Referring now more particularly to the drawing and to the characters of reference marked thereon, the rear end portion of the chassis is of conventional Hotchkiss type, and hence includes, for each side of the vehicle and below each longitudinal side beam 1, an elongated leaf spring 2 (shown housed, as is now common) which substantially centrally of its ends is rigidly strapped to the rear axle housing 3 by inverted U bolts 4. The spring is swivelly hung at its forward end, as at 5, from a rigid bracket or clevis 6 rigidly secured to beam 1, and at its rear end is swivelly hung, as at 7, from a longitudinally swingable clip or clevis 8 depending from and pivotally mounted at its upper end on beam 1.

The differential housing 9 of the drive mechanism for the rear axle 10 includes a forwardly projecting portion 11 in which the rear end of the drive shaft 12 is journaled as usual. With this arrangement a sudden rotative acceleration imparted to the drive shaft in a direction to rotate the rear wheels W forwardly, causes a rotative pressure to be exerted on the differential housing in the opposite or rearward direction, as indicated by the arrow A, and the effectiveness of such pressure is of course increased by the leverage afforded by the shaft-mounting projection 11 of the differential housing. The result is that since the housings 9 and 3 are rigid with each other and with the central portion of the spring, the forward portion 2a of the latter, between the U bolts 4 and the bracket 6, tends to bow upwardly, or in a direction the reverse of its normal intended bowing direction.

To avoid this undesirable action I dispose a rigid stay bar 13, of heavy and preferably tubular form, below the forward position 2a of the spring. At its forward end the bar 13 is pivoted, transversely of the vehicle, as at 14, in a clevis 15 which may be welded to the original spring bracket 6, or made as an integral part thereof. The pivot point 14 is as close to the spring swivel or pivot point 5 as possible.

At its rear end, which is directly under the axle housing 3 and the clamped portion of the spring, the bar 13 is pivoted transversely of the vehicle, as at 16, between ears 17 depending from a plate 18 which is orificed to receive the lower ends of the U bolts 4 therethrough, and which is clamped against the under side of the spring by the nuts 19 of said bolts so as to be rigid with the clamped portion of the spring.

As a result of this arrangement therefore, the reversely rotating tendency of the axle housing under acceleration, as previously described, is prevented or counteracted by the longitudinally unyielding stay bar, while at the same time said stay bar does not interfere with the normal up and down movement of the axle housing relative to the frame beam 1, and with the accompanying springing or yielding movement of the spring 2.

While I have here shown and described a single stay bar as mounted in connecteion with one of the suspension springs 2, it will be understood that a similar stay bar is also mounted in connection with the other suspension spring as well.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful, and upon which Letters Patent are desired:

In a motor vehicle chassis having a transverse axle housing, a longitudinal leaf suspension spring on each side thereof and pasing intermediate its ends under the axle housing, a downwardly directed fixed bracket on the chassis ahead of the axle housing and engaging one end of the spring, means connecting the other end of the spring to the chassis, connecting means between the spring and axle housing including bolts depending at the sides of the spring to a termination below the same, a substantially horizontal rigid bar disposed directly below the spring and extending between said connecting means and the bracket, means to pivotally connect the bar at one end to the bracket adjacent the point of engagement of the spring therewith, and means to pivotally mount the bar at its other end in connection with said bolts; said last named means including a plate under the spring and removably secured to said connecting bolts, ears depending from the plate and straddling the adjacent end of the bar, and a substantially horizontal transverse pivot element extending through the ears and bar.

References Cited in the file of this patent

UNITED STATES PATENTS

| | | |
|---|---|---|
| 1,019,254 | Huff | Mar. 5, 1912 |
| 1,405,637 | Sternberg | Feb. 7, 1922 |
| 1,833,405 | Bock et al. | Nov. 24, 1931 |
| 1,971,959 | Huntman | Aug. 28, 1934 |
| 2,292,210 | De Santro | Aug. 4, 1942 |
| 2,387,874 | Bradley | Oct. 30, 1945 |

FOREIGN PATENTS

| | | |
|---|---|---|
| 523,738 | Great Bhitain | July 22, 1940 |